United States Patent
Han

(10) Patent No.: US 12,291,075 B2
(45) Date of Patent: May 6, 2025

(54) SUSPENSION APPARATUS

(71) Applicant: HYUNDAI MOBIS CO., LTD., Seoul (KR)

(72) Inventor: Hyun Sik Han, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 18/501,281

(22) Filed: Nov. 3, 2023

(65) Prior Publication Data

US 2024/0239146 A1    Jul. 18, 2024

(30) Foreign Application Priority Data

Jan. 12, 2023  (KR) .................... 10-2023-0004694

(51) Int. Cl.
| | |
|---|---|
| *B60G 3/20* | (2006.01) |
| *B60G 7/00* | (2006.01) |
| *B60G 15/06* | (2006.01) |
| *B60G 15/07* | (2006.01) |
| *B60G 15/14* | (2006.01) |

(Continued)

(52) U.S. Cl.
CPC ............. *B60G 7/006* (2013.01); *B60G 3/20* (2013.01); *B60G 15/062* (2013.01); *B60G 15/07* (2013.01); *B60G 15/14* (2013.01); *B60G 17/0155* (2013.01); *B60G 17/021* (2013.01); *B60G 17/08* (2013.01); *B60G 17/016* (2013.01);

(Continued)

(58) Field of Classification Search
CPC ........ B60G 7/006; B60G 3/20; B60G 15/062; B60G 15/07; B60G 15/14; B60G 17/0155; B60G 17/021; B60G 17/08; B60G 17/016; B60G 2200/144; B60G 2202/12; B60G 2202/152; B60G 2202/24; B60G 2202/312; B60G 2202/314; B60G 2500/30;

(Continued)

(56) References Cited

U.S. PATENT DOCUMENTS

| | | | | |
|---|---|---|---|---|
| 25,243 | A | * | 8/1859 | Brevoort ............... B02C 7/12 |
| | | | | 241/259 |
| 248,116 | A | * | 10/1881 | Stearns, Jr. ........... H04R 19/04 |
| | | | | 381/369 |

(Continued)

FOREIGN PATENT DOCUMENTS

| | | | |
|---|---|---|---|
| DE | 102019208585 A1 | * | 12/2020 |
| EP | 3 569 428 A1 | | 11/2019 |

(Continued)

OTHER PUBLICATIONS

Translation of DE 102019208585 A1.*

(Continued)

Primary Examiner — Paul N Dickson
Assistant Examiner — Shams Dhanani
(74) Attorney, Agent, or Firm — NSIP Law

(57) ABSTRACT

A suspension apparatus includes a main body, a first arm configured to support a wheel with respect to the main body, a second arm spaced apart from the first arm and having a guide rail, a shock absorber disposed between the second arm and the main body, a first support member disposed on one side of the shock absorber and rotatably connected to the main body, a second support member disposed on another side of the shock absorber and seated on the guide rail, and a driver configured to adjust a height of the main body by moving the second support member along the guide rail.

20 Claims, 14 Drawing Sheets

(51) Int. Cl.
  *B60G 17/015* (2006.01)
  *B60G 17/016* (2006.01)
  *B60G 17/02* (2006.01)
  *B60G 17/08* (2006.01)

(52) U.S. Cl.
  CPC .... *B60G 2200/144* (2013.01); *B60G 2202/12* (2013.01); *B60G 2202/152* (2013.01); *B60G 2202/24* (2013.01); *B60G 2202/312* (2013.01); *B60G 2202/314* (2013.01); *B60G 2500/30* (2013.01); *B60G 2800/01* (2013.01)

(58) Field of Classification Search
  CPC .......... B60G 2800/01; B60G 2204/129; B60G 2204/421; B60G 13/005
  See application file for complete search history.

(56) References Cited

U.S. PATENT DOCUMENTS

| | | | | |
|---|---|---|---|---|
| 2005/0248116 A1* | 11/2005 | Fanson | ................ | B60G 3/265 |
| | | | | 280/124.135 |
| 2009/0072505 A1* | 3/2009 | McGinnis | .............. | B60G 9/003 |
| | | | | 280/124.116 |
| 2010/0253032 A1* | 10/2010 | Ramsey | ................ | B60G 5/047 |
| | | | | 280/124.162 |
| 2012/0049480 A1* | 3/2012 | Lee | ...................... | B60G 17/025 |
| | | | | 280/124.106 |
| 2015/0165857 A1* | 6/2015 | Chung | .............. | B60G 17/0157 |
| | | | | 280/124.151 |
| 2017/0291465 A1* | 10/2017 | Christoff | ................. | B60G 3/20 |
| 2019/0283522 A1* | 9/2019 | Battaglia | .............. | B60G 21/005 |
| 2020/0025243 A1* | 1/2020 | Seki | ...................... | F16C 19/386 |
| 2024/0239146 A1* | 7/2024 | Han | ...................... | B60G 15/14 |

FOREIGN PATENT DOCUMENTS

KR  10-2020-0025243 A   3/2020
WO  WO 2016/173768 A1  11/2016

OTHER PUBLICATIONS

Extended European search report issued on Apr. 25, 2024, in counterpart European Patent Application No. 23209385.6 (5 pages).

* cited by examiner

SUSPENSION APPARATUS

CROSS-REFERENCE TO RELATED APPLICATION

This application claims the benefit under 35 USC § 119 of Korean Patent Application No. 10-2023-0004694 filed on Jan. 12, 2023, in the Korean Intellectual Property Office, the entire disclosures of which are hereby incorporated by reference for all purposes.

BACKGROUND

1. Field

Exemplary embodiments of the present disclosure relate to a suspension apparatus, and more particularly, to a suspension apparatus capable of actively adjusting a height of a vehicle body.

2. Description of Related Art

In general, vehicles are equipped with suspensions to absorb vibration and shock transmitted from a road surface to wheels.

When a vehicle travels at high speed, it is advantageous to lower the body thereof to reduce air resistance. On the other hand, when a vehicle travels on a rough road surface, it is advantageous to raise the body thereof to prevent damage to the body.

However, as a conventional suspension supports a vehicle body at a certain height, it cannot actively adjust the height of the vehicle body to respond to various driving environments.

The related art of the present disclosure is disclosed in Korean Patent Application Publication No. 10-2020-0025243 (published on Mar. 10, 2020, entitled "VEHICLE HEIGHT ADJUSTMENT APPARATUS FOR SUSPENSION").

SUMMARY

This Summary is provided to introduce a selection of concepts in a simplified format that are further described below in the Detailed Description. This Summary is not intended to identify key features or essential features of the claimed subject matter, nor is it intended to be used as an aid in determining the scope of the claimed subject matter.

Various aspects of the disclosure are directed to a suspension apparatus capable of actively adjusting a height of a vehicle body.

In one general aspect of the disclosure, a suspension apparatus includes: a main body; a first arm configured to support a wheel with respect to the main body; a second arm spaced apart from the first arm and including a guide rail; a shock absorber disposed between the second arm and the main body; a first support member disposed on one side of the shock absorber and rotatably connected to the main body; a second support member disposed on another side of the shock absorber and seated on the guide rail; and a driver configured to adjust a height of the main body by moving the second support member along the guide rail.

The suspension apparatus may further include a guide rail that may include: a first guide groove formed concavely inward from the second arm; a second guide groove formed concavely inward from the second arm and spaced apart from the first guide groove; and a connection rail disposed between the first guide groove and the second guide groove.

The distance between the first guide groove and the first support member may be greater than a distance between the second guide groove and the first support member.

The connection rail may protrude from the second arm toward the shock absorber.

The connection rail may include a curved outer surface.

The guide rail may further include: a first stopper disposed to surround the first guide groove and configured to prevent the second support member from being separated from the first guide groove; and a second stopper disposed to surround the second guide groove and configured to prevent the second support member from being separated from the second guide groove.

The driver may include: a first joint rotatably connected to the second arm; an actuator connected to the first joint and configured to generate a driving force to rotate the first joint; and a second joint connected to the second support member and interlocked with the rotation of the first joint so that the second support member may reciprocate between the first guide groove and the second guide groove.

The actuator may be fixed to the second arm.

The first joint may include an axis of rotation disposed parallel to an axis of rotation of the first support member.

The second support member may rotate about an axis of rotation of the first joint and moves along the guide rail.

The suspension apparatus may further include: a detector configured to detect movement of the second support member; and a processor configured to control an operation of the actuator based on a vehicle height adjustment signal input from a user and data detected by the detector.

In response to the movement of the second support member being detected in a state where the vehicle height adjustment signal is not input, the processor may further be configured to control the operation of the actuator to move the second support member in a direction opposite to the direction of movement detected by the detector.

The shock absorber may include: a cylinder filled with a fluid; a piston rod installed to reciprocate in the cylinder; and an elastic member connected at both sides thereof to the cylinder and the piston rod, the elastic member comprising a length that varies with a reciprocating motion of the piston rod.

The elastic member may include a coil spring.

The elastic member may include an air spring.

In another general aspect of the disclosure, a suspension apparatus includes: a main body; a first arm configured to support a wheel with respect to the main body; a second arm spaced apart from the first arm and including a guide rail; a shock absorber disposed between the second arm and the main body; a first support member disposed on one side of the shock absorber and rotatably connected to the main body; a second support member disposed on another side of the shock absorber and seated on the guide rail; and a driver configured to adjust a height of the main body by moving the second support member along the guide rail between a first position and a second position.

The suspension apparatus may further include a guide rail that includes: a first guide groove formed concavely inward from the second arm; a second guide groove formed concavely inward from the second arm and spaced apart from the first guide groove; and a connection rail disposed between the first guide groove and the second guide groove.

The driver may include: a first joint rotatably connected to the second arm; an actuator connected to the first joint and configured to generate a driving force to rotate the first joint;

and a second joint connected to the second support member and interlocked with the rotation of the first joint so that the second support member may reciprocate between the first position at the first guide groove and the second position at the second guide groove.

The suspension apparatus may further include: a detector configured to detect movement of the second support member; and a processor configured to control an operation of the actuator based on a vehicle height adjustment signal input from a user and data detected by the detector.

In response to the movement of the second support member being detected in a state where the vehicle height adjustment signal is not input, the processor may further be configured to control the operation of the actuator to move the second support member in a direction opposite to the direction of movement detected by the detector.

DETAILED DESCRIPTION

Figure 1:
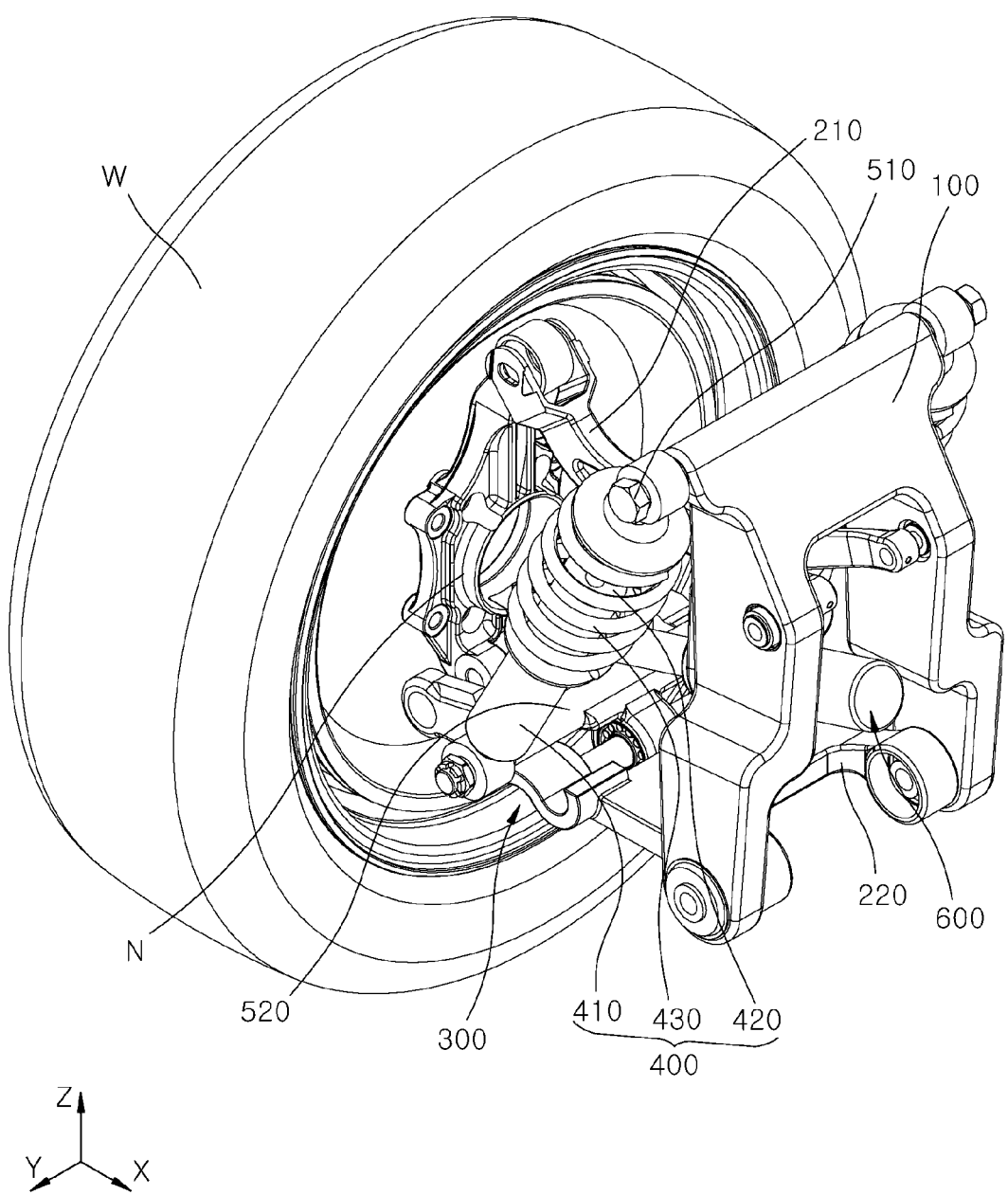
FIG. 1 is a perspective view schematically illustrating a configuration of a suspension apparatus according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, a suspension apparatus according to embodiments of the present disclosure will be described with reference to the accompanying drawings.

Figure 2:
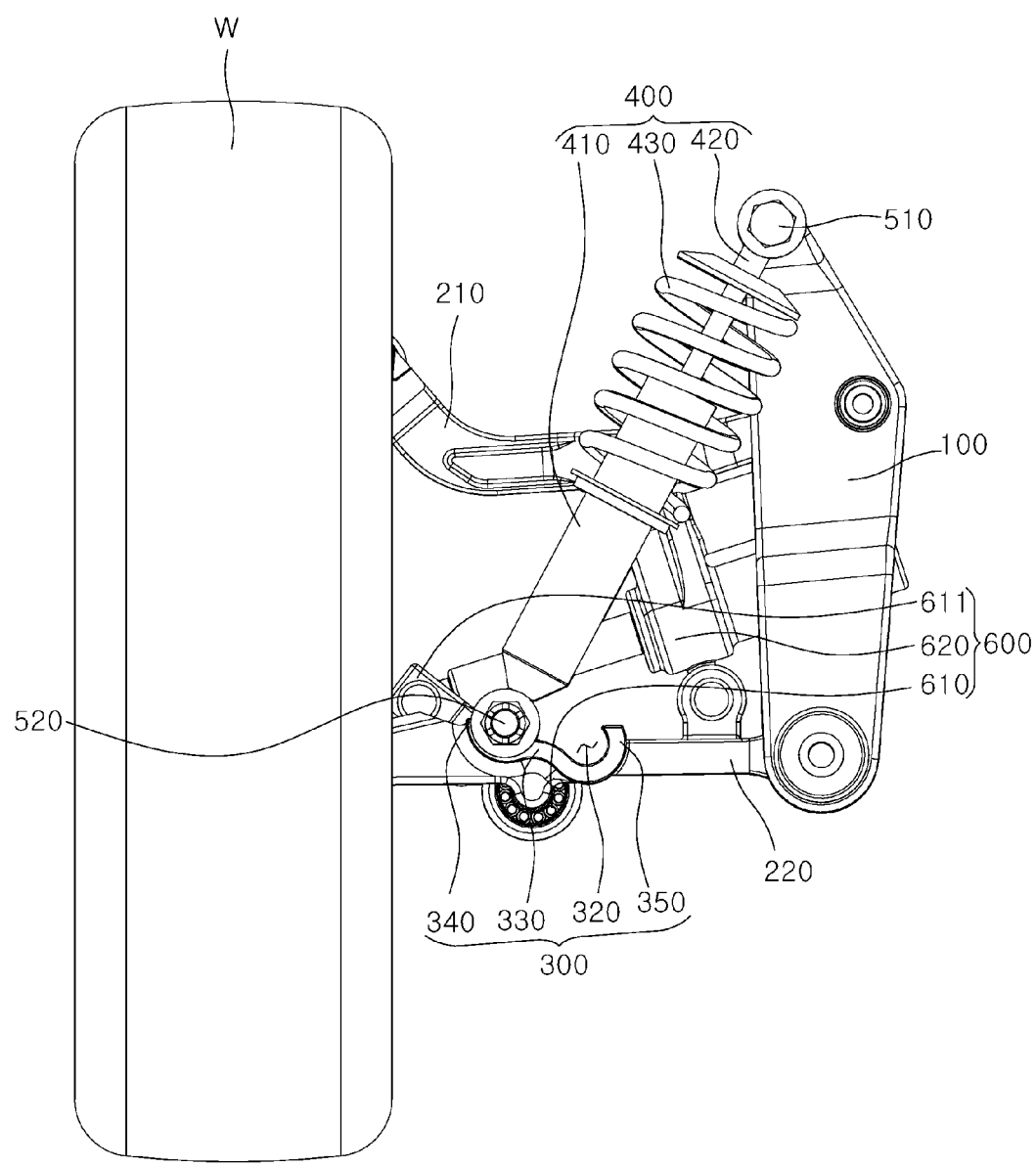
FIG. 2 is a front view schematically illustrating the configuration of the suspension apparatus according to the embodiment of the present disclosure.
Figure 3:
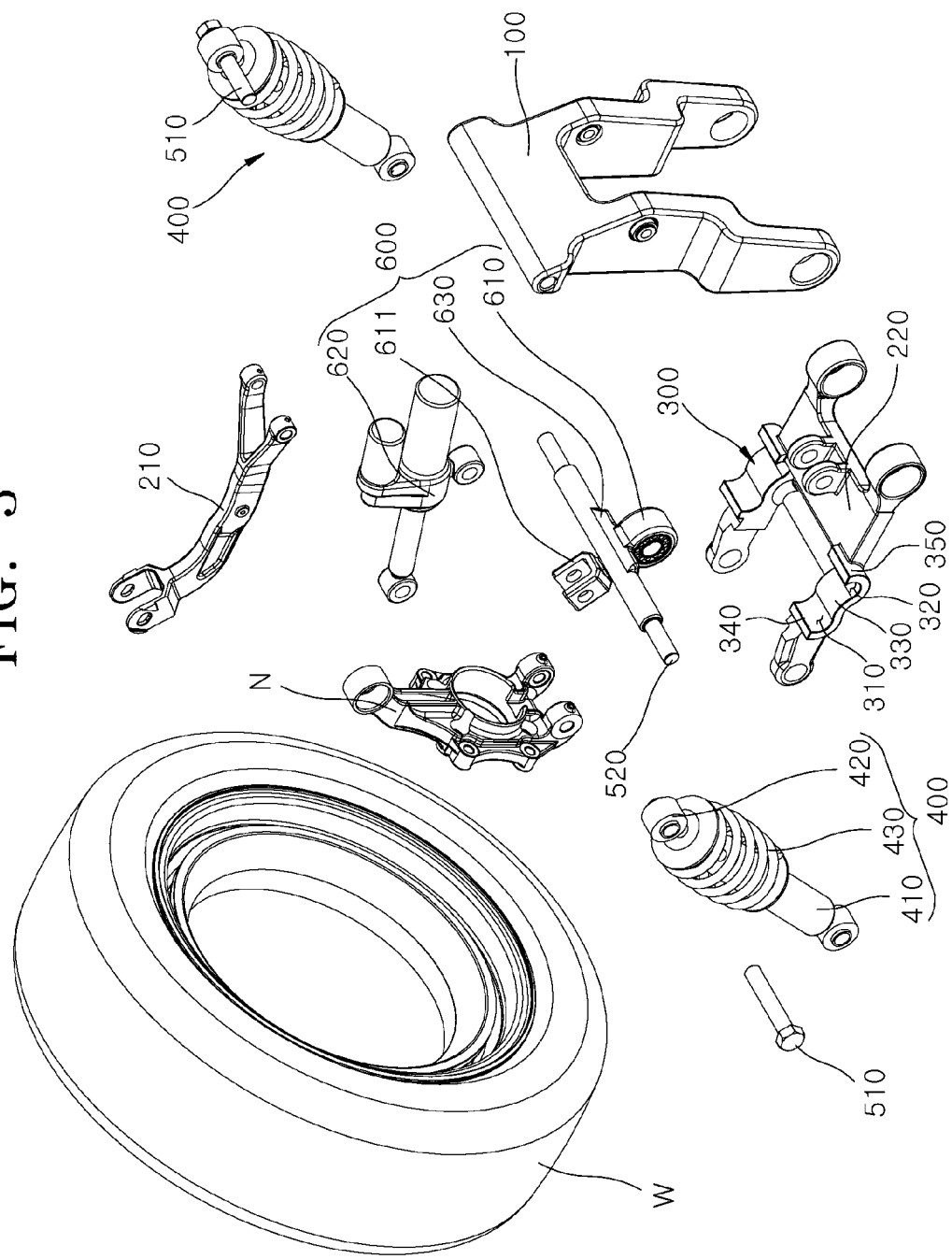
FIG. 3 is an exploded perspective view schematically illustrating the configuration of the suspension apparatus according to the embodiment of the present disclosure.

FIG. 1 is a perspective view schematically illustrating a configuration of a suspension apparatus according to an embodiment of the present disclosure. FIG. 2 is a front view schematically illustrating the configuration of the suspension apparatus according to the embodiment of the present disclosure. FIG. 3 is an exploded perspective view schematically illustrating the configuration of the suspension apparatus according to the embodiment of the present disclosure.

Referring to FIGS. 1 to 3, the suspension apparatus according to this embodiment may include a main body 100, a first arm 210, a second arm 220, a guide rail 300, a shock absorber 400, a first support member 510, a second support member 520, and a drive unit 600.

The main body 100 is disposed to face a wheel W of a vehicle. Examples of the main body 100 according to this embodiment may include various types of structures directly or indirectly connected to a vehicle body, such as a chassis frame, a subframe, or a wheel housing constituting part of the vehicle body, or a steering frame of an independent steering device rotatably connected to the vehicle body. The main body 100 may be spaced apart from the wheel W by a predetermined distance in the width direction of the vehicle body, i.e., in a direction parallel to the X-axis in FIG. 1. The main body 100 is not limited to having the shapes illustrated in FIGS. 1 to 3, and may be designed and changed into various shapes depending on the type of vehicle.

The first arm 210 and the second arm 220 support the wheel W with respect to the main body 100. More specifically, the first arm 210 and the second arm 220 function as components, which connect the wheel W to the main body 100 and at the same time absorb a load applied from the wheel W while the vehicle is traveling by its own rigidity, and control the movement of the wheel W. The first arm 210 and the second arm 220 may be spaced apart from each other in the height direction of the vehicle body, i.e., in a direction parallel to the Z-axis in FIG. 1. Hereinafter, an example will be described in which the first arm 210 is disposed above the second arm 220. The first arm 210 and the second arm 220 may be arranged such that each longitudinal direction thereof is parallel to the width direction of the vehicle body. Each of the first and second arms 210 and 220 may be rotatably connected, at one end thereof, to the main body 100 in the longitudinal direction of the vehicle body, i.e., in a direction parallel to the Y axis in FIG. 1. Each of the first and second arms 210 and 220 may be rotatably connected, at the other end thereof, to a knuckle N supporting the wheel W in a direction parallel to the longitudinal direction of the vehicle body. Each of the first and second arms 210 and 220 may be rotated, at both ends thereof, relative to the main body 100 and the knuckle N when the wheel W bumps and rebounds or when the height of the main body 100 is adjusted. The first arm 210 and the second arm 220 are not limited to having the shapes illustrated in FIGS. 1 to 3, and may be designed and changed into various shapes capable of supporting the wheel W with respect to the main body 100.

The guide rail 300 is provided on the second arm 220 and guides the movement of the second support member 520 on the second arm 220. The guide rail 300 may be disposed such that the longitudinal direction thereof is parallel to the longitudinal direction of the second arm 220, i.e., the X-axis direction in FIG. 1. The guide rail 300 may consist of a pair of guide rails. The pair of guide rails 300 may be spaced apart from each other in the width direction of the second arm 220, i.e., in a direction parallel to the Y-axis in FIG. 1.

Figure 4:
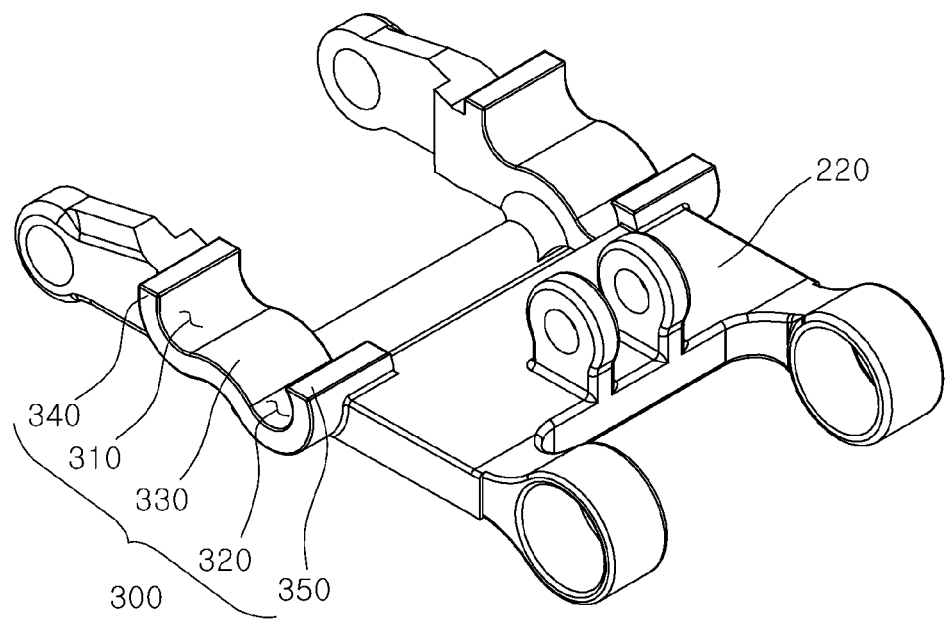
FIG. 4 is a perspective view schematically illustrating a configuration of guide rails according to the embodiment of the present disclosure.
Figure 5:
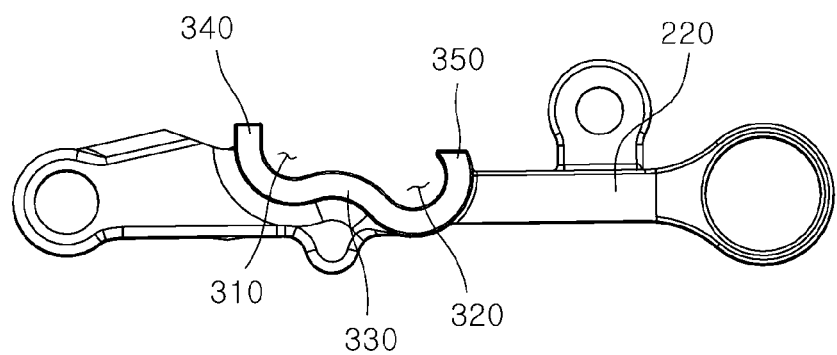
FIG. 5 is a front view schematically illustrating the configuration of one guide rail according to the embodiment of the present disclosure.

FIG. 4 is a perspective view schematically illustrating a configuration of the guide rails according to the embodiment of the present disclosure. FIG. 5 is a front view schematically illustrating the configuration of one guide rail according to the embodiment of the present disclosure.

Referring to FIGS. 4 to 5, each of the guide rails 300 according to this embodiment may include a first guide groove(s) 310, a second guide groove(s) 320, and a connection rail 330.

The first guide groove 310 defines an external appearance of one end of the guide rail 300 and functions as a component that supports the second support member 520 when the main body 100 is moved up to the highest position. The first guide groove 310 according to this embodiment may be in the form of a groove that is recessed concavely inward from the upper surface of the second arm 220. The first guide groove 310 may have a curved inner surface with any one point on the upper side of the second arm 220 as a center of curvature.

The second guide groove 320 defines an external appearance of the other end of the guide rail 300 and functions as a component that supports the second support member 520 when the main body 100 is moved down to the lowest position. The second guide groove 320 according to this embodiment may be in the form of a groove that is recessed concavely inward from the upper surface of the second arm 220. The second guide groove 320 may be spaced apart from the first guide groove 310 by a predetermined distance in the longitudinal direction of the second arm 220. The second guide groove 320 may have a curved inner surface with any one point on the upper side of the second arm 220 as a center of curvature.

The distance between the first guide groove 310 and the first support member 510 may be greater than the distance between the second guide groove 320 and the first support member 510. Accordingly, the first guide groove 310 and the second guide groove 320 may induce the main body 100 to be raised or lowered by the movement of the second support member 520.

The connection rail 330 is disposed between the first guide groove 310 and the second guide groove 320 and defines an external appearance of the center of the guide rail 300. The connection rail 330 guides the movement of the second support member 520 between the first guide groove 310 and the second guide groove 320. That is, the connection rail 330 functions as a component that provides a path for moving the second support member 520 from the first guide groove 310 to the second guide groove 320 or from the second guide groove 320 to the first guide groove 310. The connection rail 330 according to this embodiment may be configured to protrude convexly outward, more specifically, toward the shock absorber 400, from the upper surface of the second arm 220. Accordingly, the connection rail 330 allows the second support member 520 to stably remain seated in the first or second guide groove 310 or 320. The connection rail 330 may have a curved outer surface with any one point on the lower side of the second arm 220 as a center of curvature. The outer surface of the connection rail 330 may form a continuous curved surface with the inner surfaces of the first and second guide grooves 310 and 320. Accordingly, the connection rail 330 may maintain contact with the second support member 520 during the movement of the second support member 520.

The guide rail 300 according to this embodiment may further include a first stopper 340 and a second stopper 350.

The first stopper 340 prevents the second support member 520 from being separated from the first guide groove 310. More specifically, the first stopper 340 functions as a component that limits the range of movement of the second support member 520 on one side of the guide rail 300. The first stopper 340 according to this embodiment may extend upward from the upper surface of the second arm 220. The first stopper 340 may extend from one end of the first guide groove 310, disposed on the opposite side of the connection rail 330, among both ends of the first guide groove 310. The first stopper 340 may have a substantially arc shape in cross section. The first stopper 340 may have an inner surface disposed to surround part of the internal space of the first guide groove 310. The inner surface of the first stopper 340 may be a curved surface having the same center of curvature as the first guide groove 310. The inner surface of the first stopper 340 may form a continuous curved surface with the inner surface of the first guide groove 310.

The second stopper 350 prevents the second support member 520 from being separated from the second guide groove 320. More specifically, the second stopper 350 functions as a component that limits the range of movement of the second support member 520 on the other side of the guide rail 300. The second stopper 350 according to this embodiment may extend upward from the upper surface of the second arm 220. The second stopper 350 may extend from one end of the second guide groove 320, disposed on the opposite side of the connection rail 330, among both ends of the second guide groove 320. The second stopper 350 may have a substantially arc shape in cross section. The second stopper 350 may have an inner surface disposed to surround part of the internal space of the second guide groove 320. The inner surface of the second stopper 350 may be a curved surface having the same center of curvature as the second guide groove 320. The inner surface of the second stopper 350 may form a continuous curved surface with the inner surface of the second guide groove 320.

The first stopper 340 and the second stopper 350 may be open at sides facing each other. Accordingly, the first and second stoppers 340 and 350 may not interfere with the movement of the second support member 520 between the first guide groove 310 and the second guide groove 320 and may simultaneously limit the movement of the second support member 520 beyond a set range of movement.

The shock absorber 400 is disposed between the second arm 220 and the main body 100. The shock absorber 400 may be stretchable longitudinally. The shock absorber 400 may function as a component that absorbs shock or vibration transmitted from the road surface through the wheel W to the second arm 220 by means of extension and contraction. The shock absorber 400 may consist of a pair of shock absorbers disposed on both sides of the main body 100.

Figure 6:
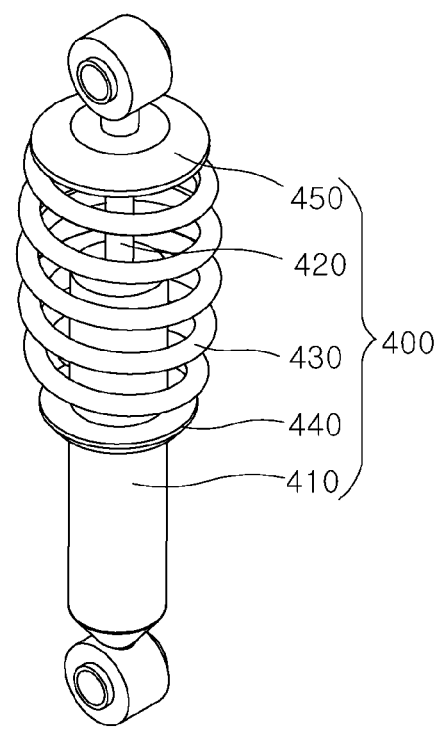
FIG. 6 is a perspective view schematically illustrating a configuration of one shock absorber according to the embodiment of the present disclosure.

FIG. 6 is a perspective view schematically illustrating a configuration of one shock absorber according to the embodiment of the present disclosure.

Referring to FIG. 6, the shock absorber 400 according to this embodiment may include a cylinder 410, a piston rod 420, and an elastic member 430 (e.g., a spring).

The cylinder 410 may have a hollow cylindrical shape with open at one side. The cylinder 410 may be filled therein with a fluid such as oil capable of performing a damping function. The cylinder 410 may be disposed such that the longitudinal direction thereof is inclined at a predetermined angle with respect to the height direction of the vehicle body, i.e., with respect to the Z-axis in FIG. 1. The cylinder 410 may be disposed such that the open end thereof is directed upward and the closed end thereof is directed downward. The lower end of the cylinder 410 may be connected to the drive unit 600 (e.g., a driver) via the second support member 520.

The piston rod 420 is installed to reciprocate in the cylinder 410. The piston rod 420 according to this embodiment may have a substantially rod shape. The piston rod 420 may be disposed such that the longitudinal direction thereof is parallel to the longitudinal direction of the cylinder 410. The piston rod 420 may have a lower end inserted into the cylinder 410 through the open side thereof. The lower end of the piston rod 420 may be supported to be slidable longitudinally in the cylinder 410. The piston rod 420 may have an upper end protruding outward from the cylinder 410. The upper end of the piston rod 420 may be connected to the main body 100 via the first support member 510.

The elastic member 430 has both sides connected to the cylinder 410 and the piston rod 420. The elastic member 430 may be configured to be deformable elastically longitudinally. The elastic member 430 may be extended or contracted in conjunction with the reciprocating motion of the piston rod 420 and may have a variable length. Examples of the elastic member 430 according to this embodiment may include a coil spring formed by spirally extending a bar, a wire, or the like made of metal. The elastic member 430 may have both ends, which are seated on a lower sheet 440 and an upper sheet 450 coupled to the respective cylinder 410 and piston rod 420 and are fixed to the lower sheet 440 and the upper sheet 450 by welding, bolting, or the like.

Figure 7:
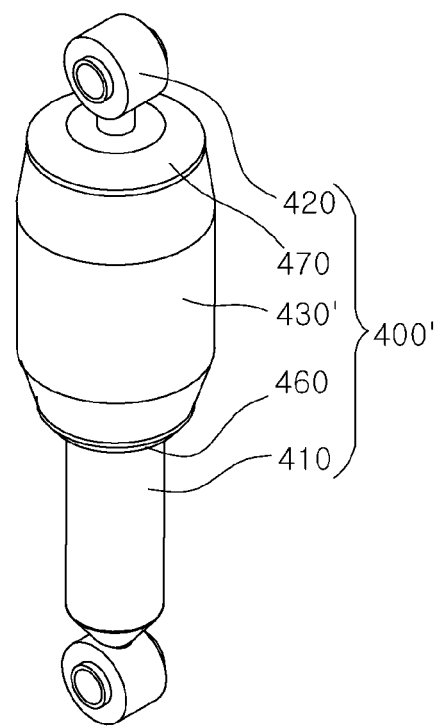
FIG. 7 is a perspective view schematically illustrating a configuration of one shock absorber according to another embodiment of the present disclosure.

FIG. 7 is a perspective view schematically illustrating a configuration of one shock absorber according to another embodiment of the present disclosure.

Referring to FIG. 7, the shock absorber, which is designated by reference numeral 400', according to this embodiment may include a cylinder 410, a piston rod 420, and an elastic member 430'.

The shock absorber 400' according to this embodiment may have the same configuration as the shock absorber 400 described with reference to FIG. 6 according to the above embodiment, with the sole exception of a detailed structure of the elastic member 430'. Accordingly, the description of the cylinder 410 and the piston rod 420 according to the above embodiment may be applied as it is to the cylinder 410 and the piston rod 420 according to this embodiment.

Examples of the elastic member 430' according to this embodiment may include an air spring that is filled therein with air and generates an elastic force by the pressure of the filled air. The elastic member 430' may have both ends that are fixed to a lower cap 460 and an upper cap 470 coupled to the respective cylinder 410 and piston rod 420. The elastic member 430' may be supplied with air or discharge air therein to the outside, through the lower cap 460 and the upper cap 470. Accordingly, the elastic member 430' may actively vary a modulus of elasticity by regulating the pressure of the air filled therein, thereby preventing the modulus of elasticity from excessively increasing or decreasing in the process of changing the height of the main body 100.

The first support member 510 is disposed on one side of each shock absorber 400 and is rotatably connected to the main body 100. The first support member 510 according to this embodiment may be in the form of a rod having a substantially circular cross section. The first support member 510 may be inserted into the main body 100 through the upper end of the piston rod 420. The first support member 510 may be integrally coupled to the upper end of the piston rod 420 by screwing or the like. The first support member 510 may be connected to the main body 100 so as to be rotatable about its axis of rotation parallel to the longitudinal direction of the vehicle body, i.e., the Y-axis direction in FIG. 1. The axis of rotation of the first support member 510 may be the same as the central axis of the first support member 510. The first support member 510 may rotate clockwise or counterclockwise about the axis of rotation thereof when the second support member 520 moves, which may vary the angle of installation of the shock absorber 400. The first support member 510 may consist of a pair of first support members. The pair of first support members 510 may individually and rotatably support the upper ends of the piston rods 420 provided in the respective shock absorbers 400 with respect to the main body 100.

The second support member 520 is disposed on the other sides of the shock absorbers 400 and is movably seated on the guide rails 300. The second support member 520 according to this embodiment may be in the form of a rod having a substantially circular cross section. The central axis of the second support member 520 may be disposed parallel to the central axis of each first support member 510. The second support member 520 may pass through the lower ends of the cylinders 410 and may be integrally coupled to the lower ends of the cylinders 410 by welding or bolting. The second support member 520 may have both ends, which pass through the lower ends of the cylinders 410 respectively provided in the pair of shock absorbers 400 and are integrally coupled to the lower ends of the cylinders 410. The second support member 520 may have an outer surface that is seated on the guide rails 300, more specifically, on the first guide grooves 310, the second guide grooves 320, or the connection rails 330. The second support member 520 may reciprocate between the first guide grooves 310 and the second guide grooves 320 by the operation of the drive unit 600, which may vary the angle of installation of each shock absorber 400.

The drive unit 600 adjusts the height of the main body 100 by moving the second support member 520 along the guide rails 300. More specifically, the drive unit 600 functions as a component that allows the second support member 520 to reciprocate between the first guide grooves 310 and the second guide grooves 320 to vary the length of each shock absorber 400 and induces the main body 100 to be raised or lowered by the tensile or compressive load generated according to the change in length of the shock absorber 400.

Figure 8:
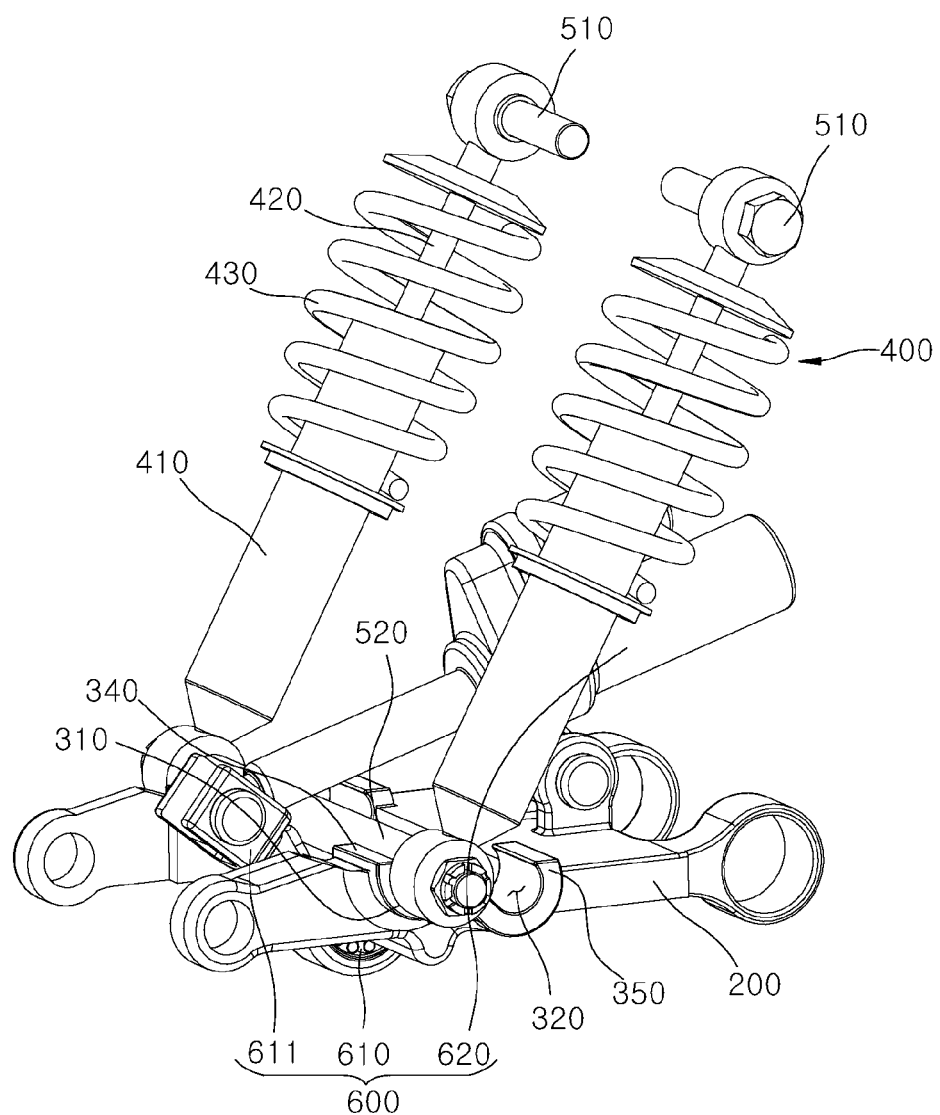
FIG. 8 is a perspective view schematically illustrating a configuration of a drive unit according to the embodiment of the present disclosure.
Figure 9:
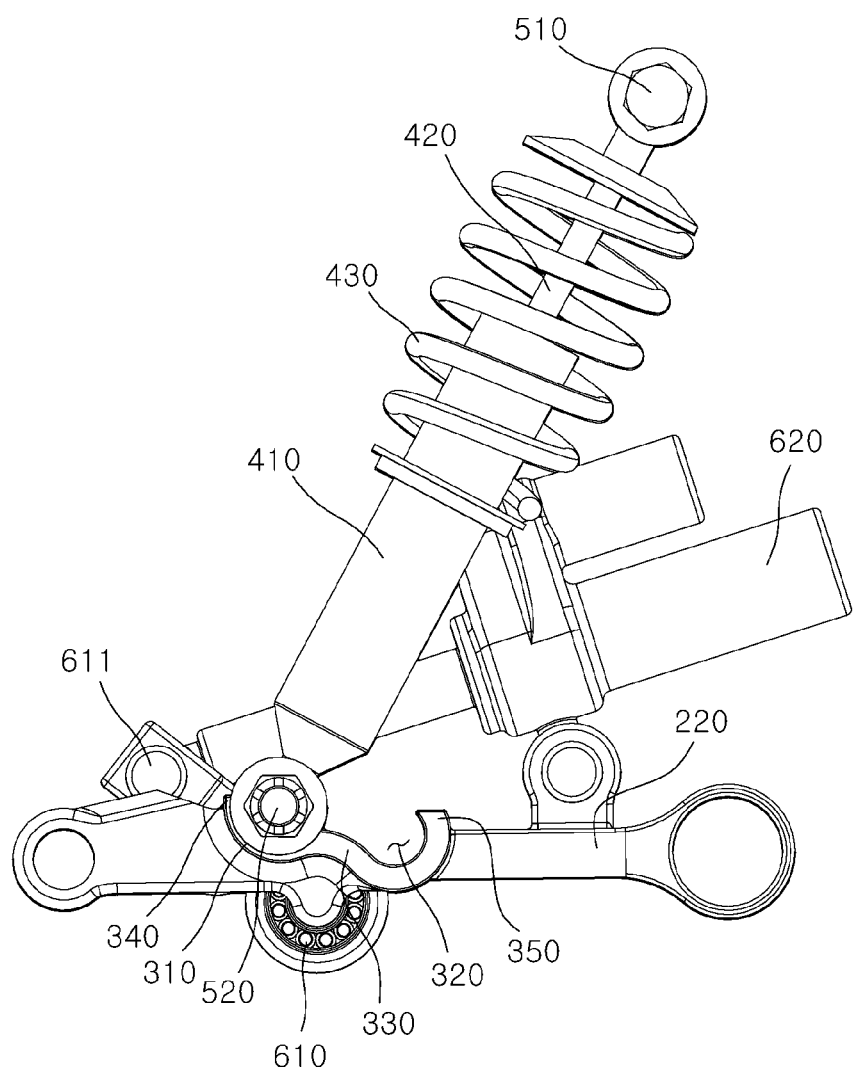
FIG. 9 is a front view schematically illustrating the configuration of the drive unit according to the embodiment of the present disclosure.

FIG. 8 is a perspective view schematically illustrating a configuration of the drive unit according to the embodiment of the present disclosure. FIG. 9 is a front view schematically illustrating the configuration of the drive unit according to the embodiment of the present disclosure.

Referring to FIGS. 8 and 9, the drive unit 600 according to this embodiment may include a first joint 610, an actuator 620, and a second joint 630.

The first joint 610 is rotatably connected to the second arm 220.

Figure 10:
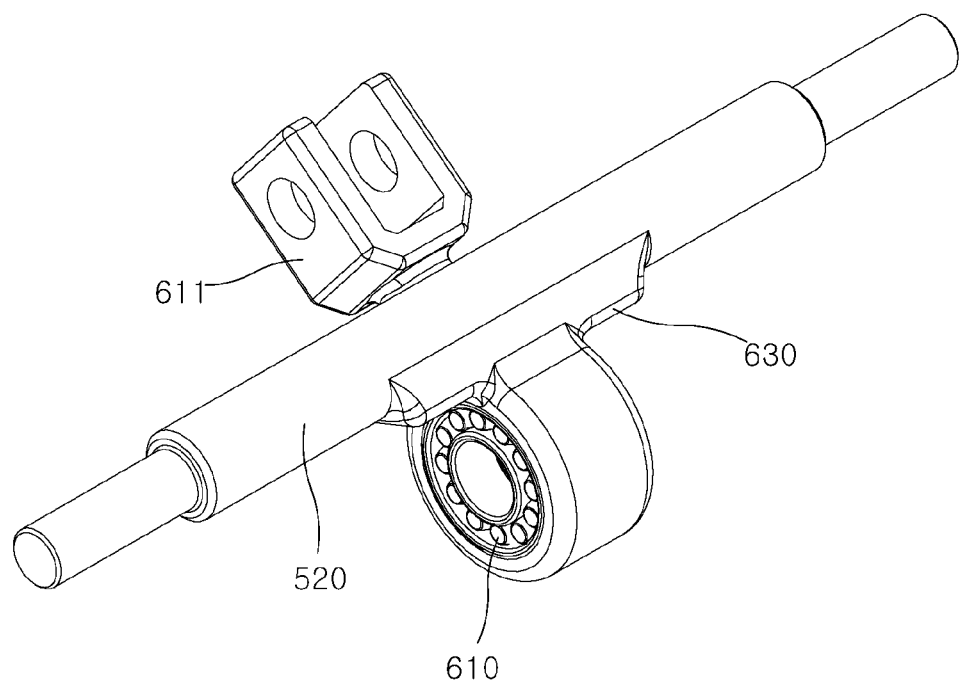
FIG. 10 is a perspective view schematically illustrating a configuration of a first joint and a second joint according to the embodiment of the present disclosure.

FIG. 10 is a perspective view schematically illustrating a configuration of the first joint and the second joint according to the embodiment of the present disclosure.

Referring to FIGS. 8 to 10, the first joint 610 according to this embodiment may have a hollow cylindrical shape with open at both sides. The first joint 610 may be connected to the second arm 220 so as to be rotatable about its axis of rotation parallel to the longitudinal direction of the vehicle body, i.e., the Y-axis direction in FIG. 1. The axis of rotation of the first joint 610 may be the same as the central axis of the first joint 610 and may be disposed parallel to the axis of rotation of each first support member 510. The first joint 610 may be rotatably supported with respect to the second arm 220 via a bearing or the like. The first joint 610 may be disposed between the pair of guide rails 300.

The actuator 620 is connected to the first joint 610 and generates a driving force to rotate the first joint 610. Examples of the actuator 620 according to this embodiment may include a hydraulic cylinder having an end linearly reciprocating in conjunction with hydraulic pressure applied from the outside. The actuator 620 may be disposed to face the upper surface of the second arm 220. The actuator 620 may be integrally fixed to the upper surface of the second arm 220 by welding or the like, or may be detachably fixed to the upper surface of the second arm 220 by bolting or the like. The actuator 620 may have an end directed toward the first joint 610. The actuator 620 may be rotatably connected, at the end thereof, to a connection bracket 611 extending radially from the outer surface of the first joint 610. The end of the actuator 620 may linearly reciprocate in the longitudinal direction of the actuator 620, apply a compressive or tensile load to the connection bracket 611, and rotate the first joint 610 clockwise or counterclockwise about the axis of rotation of the first joint 610. The actuator 620 is not limited to the form described above, and may be designed and changed into various types of power generation means, such as an electric motor that generates a rotational force by receiving power from the outside, capable of adding a rotational force to the first joint 610.

The second joint 630 rotates together with the first joint 610 and is connected to the second support member 520. The second joint 630 interlocks with the rotation of the first joint 610 so that the second support member 520 reciprocates between the first guide grooves 310 and the second guide grooves 320. That is, the second joint 630 may function as a component that transmits the rotational force of the first joint 610 to the second support member 520. The second joint 630 according to the embodiment of this disclosure may protrude radially from the outer surface of the first joint 610. The second joint 630 may be coupled to the outer surface of the second support member 520. In this case, the second joint 630 may be integrally fixed to the outer surface of the second support member 520 by welding or the like, or may be detachably fixed to the outer surface of the second support member 520 by bolting or the like. The second joint 630 supports the second support member 520 such that the central axis of the second support member 520 is parallel to the central axis of the first joint 610, i.e., the axis of rotation of the first joint 610. Accordingly, the second support member 520 may rotate about the axis of rotation of the first joint 610 and reciprocate along the guide rails 300.

Figure 11:
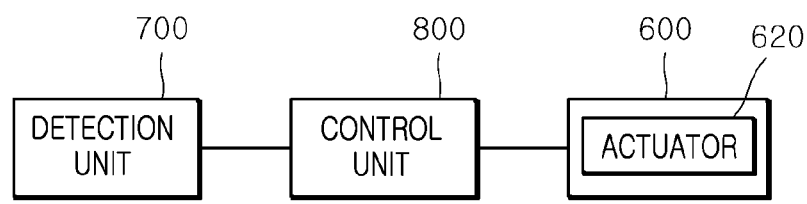
FIG. 11 is a block diagram schematically illustrating a configuration of a detection unit and a control unit according to the embodiment of the present disclosure.

FIG. 11 is a block diagram schematically illustrating a configuration of a detection unit and a control unit according to the embodiment of the present disclosure.

Referring to FIG. 11, the suspension apparatus according to this embodiment may further include a detection unit 700 (e.g., a detector) and a control unit 800 (e.g., a processor).

The detection unit 700 detects the movement of the second support member 520. The detection unit 700 according to this embodiment may include a rotation angle sensor for detecting the angle of rotation of the second support member 520 about the axis of rotation of the first joint 610, and an acceleration sensor for detecting the magnitude of acceleration acting on the second support member 520 when the second support member 520 moves. The detection unit 700 may be installed in various positions, such as the second arm 220, the actuator 620, and the first joint 610, capable of detecting the angle of rotation and acceleration of the second support member 520.

The control unit 800 controls the operation of the actuator 620 based on a vehicle height adjustment signal input from a user and data detected by a sensor. The control unit 800 may include an electronic control unit (ECU), a central processing unit (CPU), a processor, or a system on chip (SoC). The control unit 800 may drive an operating system or an application to control a plurality of hardware or software components and may perform various data processing and calculation operations. The control unit 800 may be configured to execute at least one command stored in a memory and store the result data of execution in the memory.

The vehicle height adjustment signal may be generated by a user terminal or a vehicle interface through user's touch input or the like. The control unit 800 may be connected to the user terminal or the vehicle interface by wire or wirelessly, and may receive the vehicle height adjustment signal generated by the user terminal or the vehicle interface in a wired or wireless manner. The vehicle height adjustment signal may include an up signal and a down signal. The control unit 800 may operate, in response to the up signal input thereto, the actuator 620 to move the second support member 520 in a direction in which the main body 100 is raised. The control unit 800 may operate, in response to the down signal input thereto, the actuator 620 to move the second support member 520 in a direction in which the main body 100 is lowered. The control unit 800 may determine whether to operate the actuator 620 and control the magnitude of the driving force generated by the actuator 620 based on the angle of rotation and magnitude of acceleration of the second support member 520 detected by the detection unit 700.

Hereinafter, the operation of the suspension apparatus according to the embodiment of the present disclosure will be described.

Figure 12:
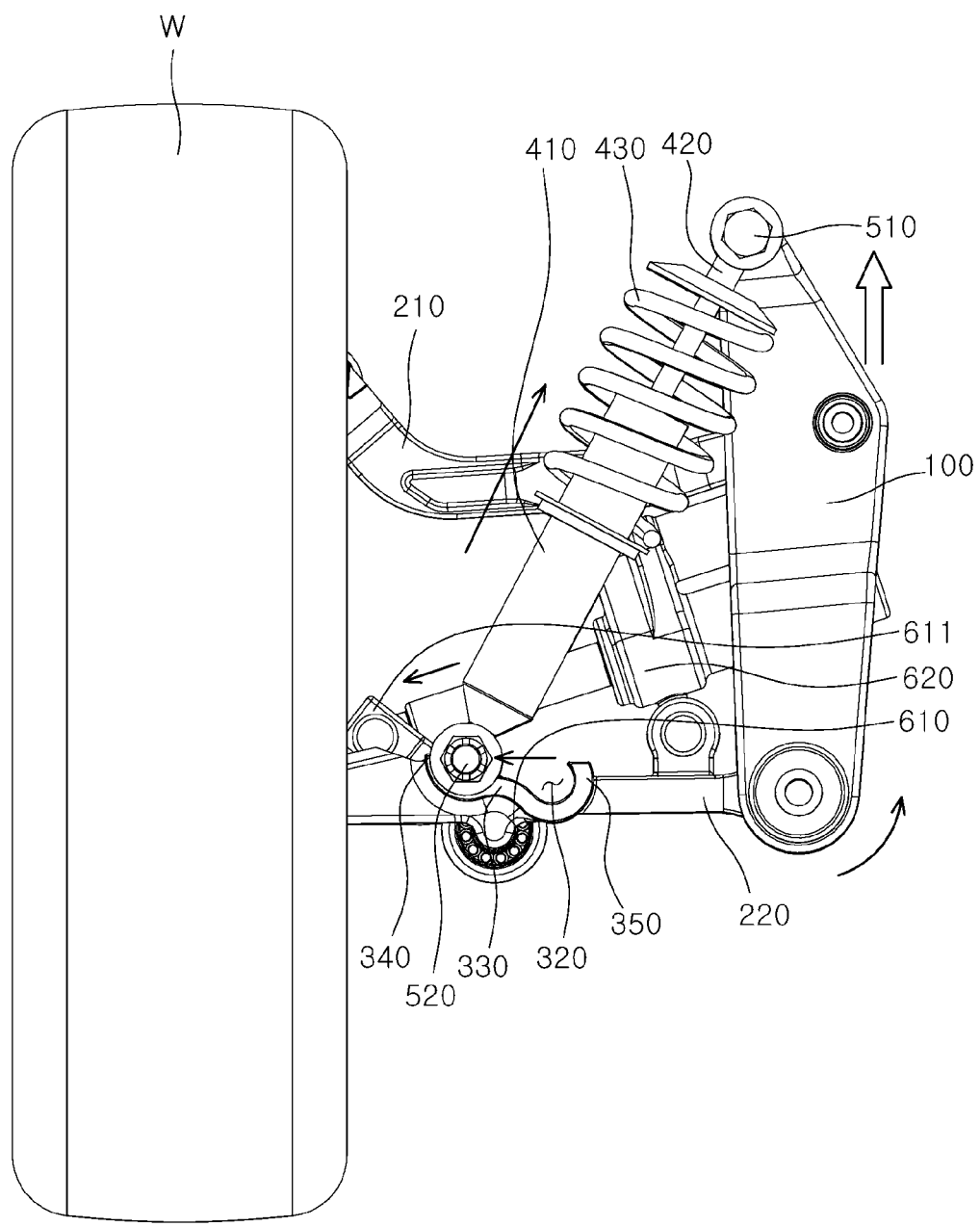
FIG. 12 is a view illustrating a state in which a vehicle is raised by the suspension apparatus according to the embodiment of the present disclosure.

FIG. 12 is a view illustrating a state in which the vehicle is raised by the suspension apparatus according to the embodiment of the present disclosure.

Referring to FIGS. 1 to 12, when the vehicle body is intended to be raised, the user terminal or the vehicle interface generates an up signal through user's touch input.

In a state in which the second support member 520 is seated on the second guide grooves 320, the control unit 800 operates the actuator 620 so that the end of the actuator 620 moves forward as the up signal generated by the user terminal or the vehicle interface is input to the control unit 800.

The end of the actuator 620 applies a compressive load to the connection bracket 611 by forward movement, and the first joint 610 rotates counterclockwise (see FIG. 12) about the axis of rotation thereof.

The second joint 630 rotates counterclockwise about the axis of rotation of the first joint 610, and the second support member 520 seated on the second guide grooves 320 moves to the first guide grooves 310 through the connection rails 330.

During the movement of the second support member 520, the detection unit 700 detects the movement of the second support member 520.

As the second support member 520 is completely seated on the first guide grooves 310, the outer surface of the second support member 520 comes into contact with the inner surfaces of the first stoppers 340 so that the movement of the second support member 520 is stopped.

Subsequently, the control unit 800 determines that the movement of the second support member 520 is completed as the movement of the second support member 520 is not detected by the detection unit 700, and thus stops the operation of the actuator 620.

Meanwhile, as the distance between each first guide groove 310 and the associated first support member 510 is greater than the distance between each second guide groove 320 and the associated first support member 510, a tensile load is longitudinally applied to each shock absorber 400 while the second support member 520 moves from the second guide groove 320 to the first guide groove 310.

The shock absorber 400 is longitudinally stretched by this tensile load.

The main body 100 is moved upward in proportion to the increased length of the shock absorber 400, and the vehicle is also raised by the upward movement of the main body 100.

Figure 13:
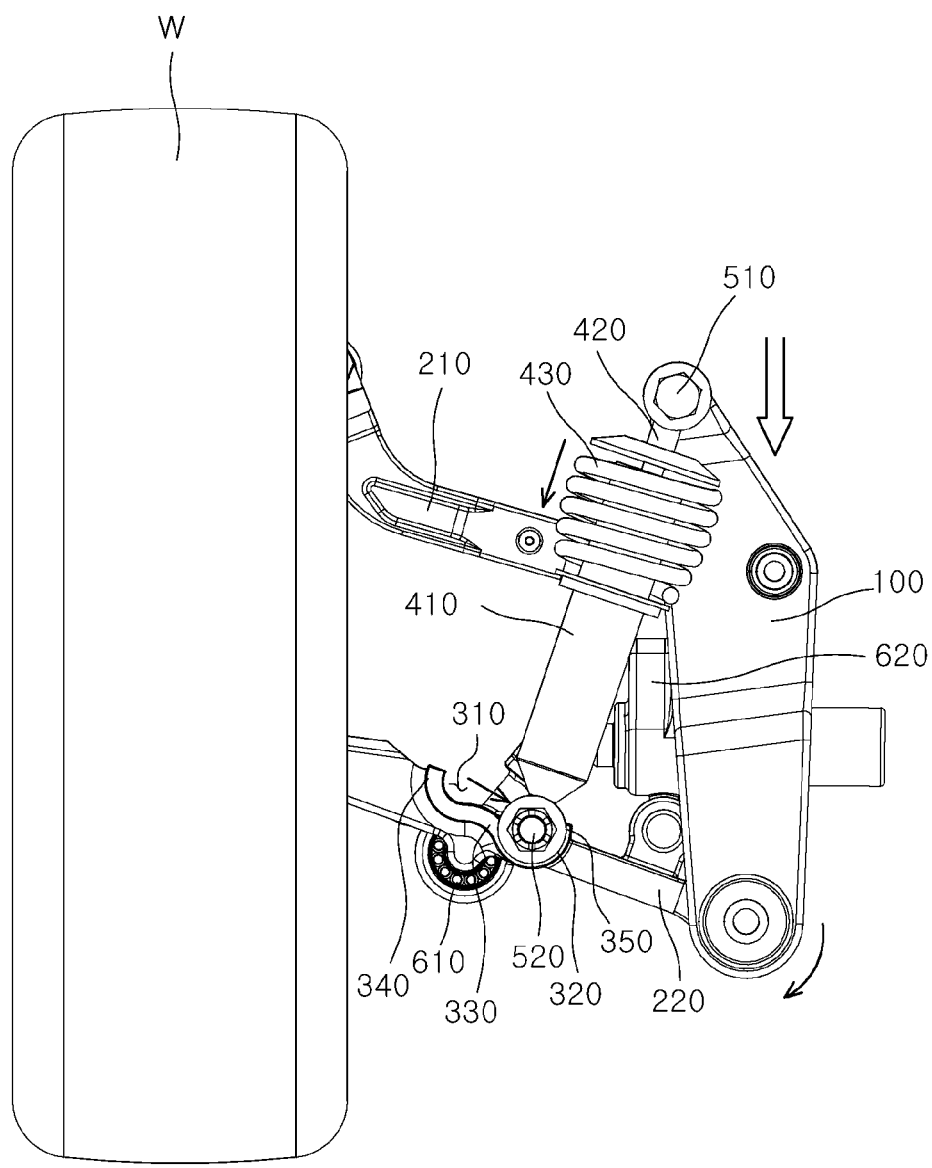
FIG. 13 is a view illustrating a state in which a vehicle is lowered by the suspension apparatus according to the embodiment of the present disclosure.

FIG. 13 is a view illustrating a state in which the vehicle is lowered by the suspension apparatus according to the embodiment of the present disclosure.

Referring to FIGS. 1 to 13, when the vehicle body is intended to be lowered, the user terminal or the vehicle interface generates a down signal through user's touch input.

In a state in which the second support member 520 is seated on the first guide grooves 310, the control unit 800 operates the actuator 620 so that the end of the actuator 620 moves backward as the down signal generated by the user terminal or the vehicle interface is input to the control unit 800.

The end of the actuator 620 applies a tensile load to the connection bracket 611 by backward movement, and the first joint 610 rotates clockwise (see FIG. 13) about the axis of rotation thereof.

The second joint 630 rotates clockwise about the axis of rotation of the first joint 610, and the second support member 520 seated on the first guide grooves 310 moves to the second guide grooves 320 through the connection rails 330.

As the second support member 520 is completely seated on the second guide grooves 320, the outer surface of the second support member 520 comes into contact with the inner surfaces of the second stoppers 350 so that the movement of the second support member 520 is stopped.

Subsequently, the control unit 800 determines that the movement of the second support member 520 is completed as the movement of the second support member 520 is not detected by the detection unit 700, and thus stops the operation of the actuator 620.

Meanwhile, as the distance between each second guide groove 320 and the associated first support member 510 is smaller than the distance between each first guide groove 310 and the associated first support member 510, a compressive load is longitudinally applied to each shock absorber 400 while the second support member 520 moves from the first guide groove 310 to the second guide groove 320.

The shock absorber 400 is longitudinally compressed by this compressive load.

The main body 100 is moved downward in proportion to the decreased length of the shock absorber 400, and the vehicle is also lowered by the downward movement of the main body 100.

Figure 14:
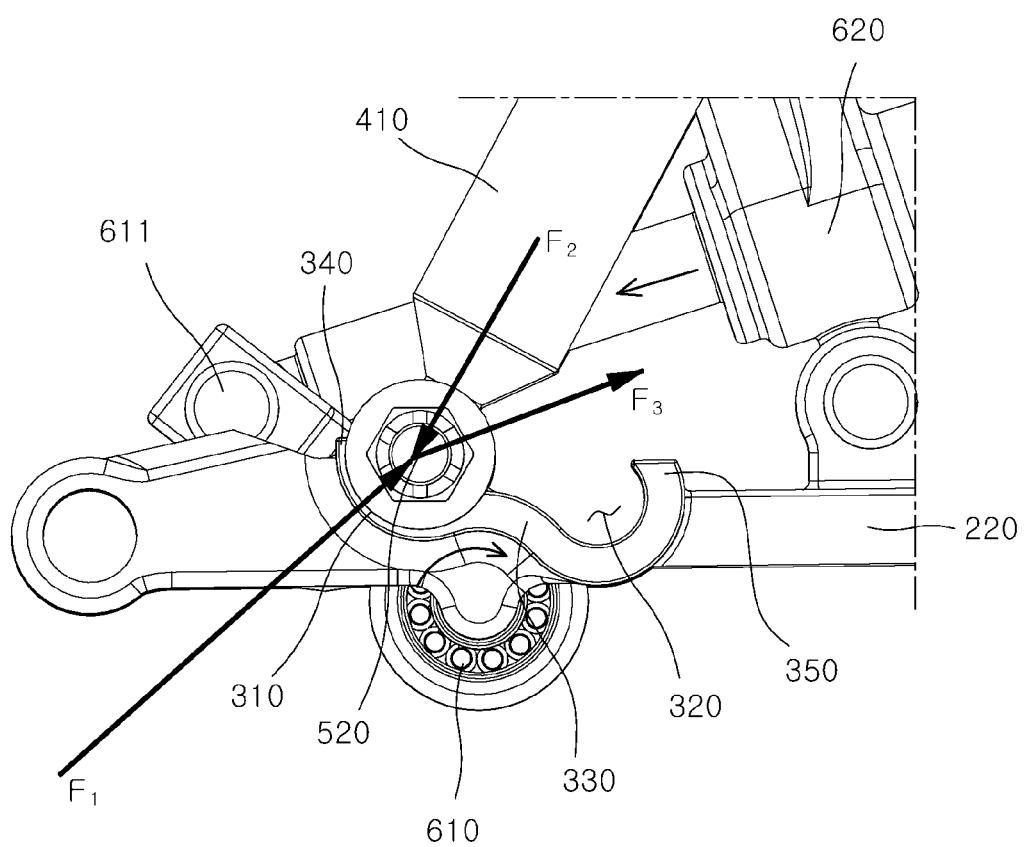
FIG. 14 is a view schematically illustrating a state in which an external force is applied to the suspension apparatus according to the embodiment of the present disclosure.

FIG. 14 is a view schematically illustrating a state in which an external force is applied to the suspension apparatus according to the embodiment of the present disclosure.

Referring to FIGS. 1 to 14, in the event of a vehicle collision, an external force F1 may be applied to the second support member 520 seated on the first guide grooves 310 in the direction shown in FIG. 14.

By the external force F1 applied to each first guide groove 310 and the supporting force F2 acting in the longitudinal direction of each shock absorber 400, a resultant force F3 may act on the second support member 520 in the direction shown in FIG. 14.

The second support member 520 may move from the first guide grooves 310 to the second guide grooves 320 without the operation of the actuator 620 by the resultant force F3.

In a state in which the down signal is not input from the user terminal or the vehicle interface, if the movement of the second support member 520 is detected by the detection unit 700, the control unit 800 determines that the movement of the second support member 520 detected by the detection unit 700 is abnormal.

Subsequently, the control unit 800 operates the actuator 620 to remove the resultant force F3 applied to the second support member 520.

More specifically, in a state in which the down signal is not input from the user terminal or the vehicle interface, if the variation in the angle of rotation of the second support member 520 detected by the detection unit 700 is equal to or greater than a set value (e.g., 10°) and the magnitude of the acceleration acting on the second support member 520 is greater than zero (0), the control unit 800 determines that the movement of the second support member 520 is abnormal.

Subsequently, the control unit 800 calculates the driving force of the actuator 620, which is capable of maintaining or returning the second support member 520 on or to the first guide grooves 310, based on the variation in the angle of rotation of the second support member 520 detected by the detection unit 700 and the magnitude of the acceleration acting on the second support member 520.

The control unit 800 causes the end of the actuator 620 to move forward with the calculated driving force.

The end of the actuator 620 applies a compressive load to the connection bracket 611 by forward movement.

The compressive load applied to the connection bracket 611 acts to cancel the resultant force F3 applied to the second support member 520.

The second support member 520 is maintained on or returned to the first guide grooves 310 by the compressive load applied from the actuator 620.

Subsequently, if the external force F1 applied to the second support member 520 is removed and the variation in the angle of rotation of the second support member 520 detected by the detection unit 700 is less than the set value (e.g., 10°), the control unit 800 stops the operation of the actuator 620.

While the present disclosure has been described with respect to the embodiments illustrated in the drawings, it will be obvious to those skilled in the art that such embodiments are provided by way of example only. It will be understood by those skilled in the art that various modifications and other equivalent embodiments may be made without departing from the spirit and scope of the disclosure as defined in the following claims.

Therefore, the technical protection scope of the present disclosure should be defined by the following claims.

What is claimed is:

1. A suspension apparatus comprising:
a main body;
a first arm configured to support a wheel with respect to the main body;
a second arm spaced apart from the first arm and including a guide rail;
a shock absorber disposed between the second arm and the main body;
a first support member disposed on one side of the shock absorber and rotatably connected to the main body;
a second support member disposed on another side of the shock absorber and seated on the guide rail; and
a driver configured to adjust a height of the main body by moving the second support member along the guide rail.

2. The suspension apparatus according to claim 1, wherein the guide rail comprises:
a first guide groove formed concavely inward from the second arm;
a second guide groove formed concavely inward from the second arm and spaced apart from the first guide groove; and
a connection rail disposed between the first guide groove and the second guide groove.

3. The suspension apparatus according to claim 2, wherein a distance between the first guide groove and the first support member is greater than a distance between the second guide groove and the first support member.

4. The suspension apparatus according to claim 2, wherein the connection rail protrudes from the second arm toward the shock absorber.

5. The suspension apparatus according to claim 2, wherein the connection rail comprises a curved outer surface.

6. The suspension apparatus according to claim 2, wherein the guide rail further comprises:
a first stopper disposed to surround the first guide groove and configured to prevent the second support member from being separated from the first guide groove; and
a second stopper disposed to surround the second guide groove and configured to prevent the second support member from being separated from the second guide groove.

7. The suspension apparatus according to claim 2, wherein the driver comprises:
a first joint rotatably connected to the second arm;
an actuator connected to the first joint and configured to generate a driving force to rotate the first joint; and
a second joint connected to the second support member and interlocked with the rotation of the first joint so that the second support member may reciprocate between the first guide groove and the second guide groove.

8. The suspension apparatus according to claim 7, wherein the actuator is fixed to the second arm.

9. The suspension apparatus according to claim 7, wherein the first joint comprises an axis of rotation disposed parallel to an axis of rotation of the first support member.

10. The suspension apparatus according to claim 7, wherein the second support member rotates about an axis of rotation of the first joint and moves along the guide rail.

11. The suspension apparatus according to claim 7, further comprising:
a detector configured to detect movement of the second support member; and
a processor configured to control an operation of the actuator based on a vehicle height adjustment signal input from a user and data detected by the detector.

12. The suspension apparatus according to claim 11, wherein, in response to the movement of the second support member being detected in a state where the vehicle height adjustment signal is not input, the processor is further configured to control the operation of the actuator to move the second support member in a direction opposite to the direction of movement detected by the detector.

13. The suspension apparatus according to claim 1, wherein the shock absorber comprises:
a cylinder filled with a fluid;
a piston rod installed to reciprocate in the cylinder; and
an elastic member connected at both sides thereof to the cylinder and the piston rod, the elastic member comprising a length that varies with a reciprocating motion of the piston rod.

14. The suspension apparatus according to claim 13, wherein the elastic member comprises a coil spring.

15. The suspension apparatus according to claim 13, wherein the elastic member comprises an air spring.

16. A suspension apparatus comprising:
a main body;
a first arm configured to support a wheel with respect to the main body;
a second arm spaced apart from the first arm and including a guide rail;
a shock absorber disposed between the second arm and the main body;
a first support member disposed on one side of the shock absorber and rotatably connected to the main body;
a second support member disposed on another side of the shock absorber and seated on the guide rail; and
a driver configured to adjust a height of the main body by moving the second support member along the guide rail between a first position and a second position.

17. The suspension apparatus according to claim 16, wherein the guide rail comprises:
a first guide groove formed concavely inward from the second arm;
a second guide groove formed concavely inward from the second arm and spaced apart from the first guide groove; and
a connection rail disposed between the first guide groove and the second guide groove.

18. The suspension apparatus according to claim 17, wherein the driver comprises:
a first joint rotatably connected to the second arm;
an actuator connected to the first joint and configured to generate a driving force to rotate the first joint; and
a second joint connected to the second support member and interlocked with the rotation of the first joint so that the second support member may reciprocate between the first position at the first guide groove and the second position at the second guide groove.

19. The suspension apparatus according to claim 18, further comprising:
a detector configured to detect movement of the second support member; and
a processor configured to control an operation of the actuator based on a vehicle height adjustment signal input from a user and data detected by the detector.

20. The suspension apparatus according to claim 19, wherein, in response to the movement of the second support member being detected in a state where the vehicle height adjustment signal is not input, the processor is further configured to control the operation of the actuator to move the second support member in a direction opposite to the direction of movement detected by the detector.

* * * * *